(12) United States Patent
Hurlbutt et al.

(10) Patent No.: US 8,484,104 B1
(45) Date of Patent: Jul. 9, 2013

(54) METHODS AND SYSTEMS FOR AUTOMATIC BILL PAY SETUP FOR ONLINE BILL PAY SYSTEMS

(75) Inventors: Thomas E. Hurlbutt, Mountain View, CA (US); Craig A. Heath, Paradise, CA (US); Matthew J. Homier, San Francisco, CA (US); Jose M. Resendiz, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 180 days.

(21) Appl. No.: 12/771,870

(22) Filed: Apr. 30, 2010

(51) Int. Cl.
*G06Q 40/00* (2012.01)
(52) U.S. Cl.
USPC .................................. 705/30; 705/40; 705/34
(58) Field of Classification Search
None
See application file for complete search history.

(56) References Cited

U.S. PATENT DOCUMENTS

| 7,890,405 | B1 * | 2/2011 | Robb | 705/36 R |
| 7,958,049 | B2 * | 6/2011 | Jamison et al. | 705/40 |
| 2004/0143546 | A1 * | 7/2004 | Wood et al. | 705/40 |
| 2008/0275816 | A1 * | 11/2008 | Hazlehurst | 705/40 |
| 2009/0182654 | A1 * | 7/2009 | Mullen et al. | 705/30 |
| 2010/0306091 | A1 * | 12/2010 | Homer et al. | 705/34 |
| 2011/0029620 | A1 * | 2/2011 | Bonforte | 709/206 |
| 2011/0166911 | A1 * | 7/2011 | Newman et al. | 705/7.33 |

* cited by examiner

*Primary Examiner* — Ryan Zeender
*Assistant Examiner* — Kristie A Mahone
(74) *Attorney, Agent, or Firm* — Vista IP Law Group LLP

(57) ABSTRACT

Systems and methods for adding a payee to a user's list of payees in an online bill payment system provided by a financial institution. The online bill payment system accesses financial data of the user from a personal finance management application or a financial institution. The financial data is analyzed by a computer to identify payees of the user. The bill payment system determines if it has payment information for the identified payee, and adds the payee to the user's list of payees. Alternatively, the financial data may be accessed and aggregated by a personal finance management application and then analyzed by a computer to identify a payee. Then the identified payee is communicated to the online bill payment system, which adds the identified payee to the user's list of payees.

13 Claims, 3 Drawing Sheets

METHODS AND SYSTEMS FOR AUTOMATIC BILL PAY SETUP FOR ONLINE BILL PAY SYSTEMS

BACKGROUND

The invention relates to methods and systems for online bill payment website applications; and more particularly, to new methods and systems for automatically setting up bill pay payments in an online bill pay system.

Online bill pay systems allow a user to pay bills from various payees through a website portal of a financial institution or a third party website portal service provider. These online bill payment systems (sometime called online bill payment application or online bill payment solutions) are offered by financial institutions such as banks, credit card issuers, stock brokers, etc. The online bill pay systems allow a user to view, review, and/or make payments and pay bills to various payees from the user's financial account at the respective financial institutions.

The user simply navigates to the online bill payment website using a web browser on a web enabled device, such as a personal computer, or even a cell phone, connected to the internet. Generally, the user sets up a list of payees in the online bill payment application and then can enter payment instructions for each payee that the user desires to make a payment. The user creates the user's list of payees by selecting the payees from a list of available payees provided by the online bill payment application. The application may also allow the user to search for payees using search terms, alphabetized groups, categorized groups, or the like. The user can make individual payments or can set up recurring payments to a payee, such as a specified amount every month or other periodic payment.

Some online bill payment applications have the capability to receive electronic bills (also referred to as e-bills), in which case the user can use the online bill payment application to view the bill, and then make a desired payment. If the user receives e-bills on the bill payment system for a payee, the user may be able to set up automatic recurring payments in which the bill payment system may make a payment to the payee for the full outstanding balance, the minimum required payment, or another amount specified by the user. In this way, once the user sets up the payment preferences for a payee, the bill payment application can make payments to the payee without any further action by the user. This provides a significant convenience to the user.

While providing many conveniences to the user, the current online bill payment applications have some limitations too. For example, a user must first set up a payee in the online banking application to add the payee to the user's list of payees. Some users may not know how to do this, or may be too concerned of making an error or doing something incorrectly, or may not have the time to set up the payees. In addition, online bill payment applications can only make electronic payments to payees that are registered (meaning the payee is already set up in the bill payment system). For non-registered payees, the online bill payment applications may be able to send a check, but even in this case, the user must provide all of the payment information for the payee, such as payee name, and address. Moreover, users may have accounts with multiple financial institutions. As a result, if a user is currently paying bills from an account at a different financial institution from the bill payment system, then those payees cannot be set up of the user in the bill payment system because they are unknown to the bill payment system.

Personal finance software applications (including online applications) allow a user to organize and track accounts and activity at multiple financial institutions, but do not have the ability to automatically make payments to a user's payees. As examples, Quicken® is a desktop and online personal finance software application, available from Intuit Inc., Mountain View, Calif., and Mint® is an online application (See the website "mint.com"). Such personal finance applications can perform financial management functions such as managing bills and providing reminders to pay bills, tracking and managing investments, performing budgeting tasks, viewing and printing summaries and reports, preparing and printing expense reports, and writing checks. The applications can download banking, financial and billing data directly from banks, companies, and financial institutions through a secure internet connection. The applications can create a financial profile of the user in which users can review their financial "picture," review spending and saving habits, create budgets and spending and saving goals, calculate gains and losses on investments, and have reminders set to emphasize dates on which bills or other obligations are to be paid. More sophisticated applications can also manage small business income and expenses, and investment properties. The applications can also compare a user's bank accounts, credit cards, brokerage accounts, and even other service and utility accounts like cellular phone service, cable/satellite TV, gas and electric, with competing accounts to determine if there are more cost effective options.

One known online banking system allows a user to aggregate financial data from numerous financial institutions from a single website, and then analyzes and organizes the data and provides the financial management functions described above for personal finance applications. This online banking system is FinanceWorks™ provided by Intuit Financial Services, a unit of Intuit Inc., of Mountain View, Calif. However, FinanceWorks™ does not provide any bill payment functions.

While current online bill payment applications and personal finance management applications provide some functionality for paying, managing and reviewing bills, additional functionality can be useful.

SUMMARY

The present invention is directed to methods and systems for adding a payee to a user's list of payees in an online bill payment system in a more automated manual and more convenient way than having the user manually set up each payee, as in current online bill payment systems of financial institutions. As described above, online bill payment systems use a list of available payees set up by particular user. The user selects a payee from the list and then sets up payment instructions for each payee in the list of payees. The present invention provides a less manual and easier method for adding a payee to the user's list of payees.

One embodiment of the present invention is directed to a method for adding a payee to a user's list of payees in an online bill payment system provided by a financial institution, such as a bank, stock broker, or other financial services entity. The bill payment system electronically accesses financial data from either a financial management software application or a different financial institution than the provider of the online bill payment system. The financial data may include any data related to financial accounts, financial transactions, merchant accounts and bill payments of the user. The financial data is then analyzed by a computer to identify one or more payees of the user. For example, the financial data may include payment data showing that the user has previously sent payments to "Acme Wireless" every month for the past 6 months. The computer uses software to analyze this data and determines that this recurring payment is likely a payment to a payee of the user named "Acme Wireless" that the user may want to have in the user's list of payees in the online bill payment system.

Next, the online bill payment system determines if it has payment information for the identified payee, such as an Automated Clearing House (ACH) authorization or payment address, or is registered with the online bill payment system to accept payments made via the online bill payment system. If the online bill payment system has payment information for the identified payee, the payee is added to the user's list of payees. The online bill payment system may also automatically add a payment amount and date for making the payment, if the financial data provides information regarding those payment details.

If the online bill payment system does not have payment information for the identified payee, then an incomplete payee may be added to the payee list, and the first time the user attempts to make a payment to this payee, the user is asked for information sufficient to make the payment or to obtain the payment information for the payee. Alternatively, the system may request the additional information from the user prior to adding the incomplete payee to the user's list of payees.

In another embodiment of the method of the present invention, a method for adding a payee to a user's list of payees in an automated bill payment system provided by a financial institution, comprises aggregating financial data of the user from a plurality of different financial institutions into a personal finance management application. For example, FinanceWorks® or Mint.com, or Quicken (described above) may be used to access and aggregate financial data of the user from multiple financial institutions at which the user has an account.

The financial data is analyzed by a computer to identify payee information. Payee information is financial data that is related to a payee of the user which can be used to identify the payment information for the payee, such as the identity of the payee, payee payment information, payee address, amount owed, payment due dates, and amounts due (such as minimum amount and total balance).

The payee information is also analyzed by a computer to identify one or more payees. The steps of analyzing the data to identify payee information and analyzing the payee information to identify one or more payee may be performed simultaneously, or they may be performed sequentially. Also, these steps may be performed by the same computer, or different computers.

The online bill payment system then adds the one or more identified payees to the user's list of payees.

Another embodiment of the present invention is directed to a system for implementing any of the above-described methods for adding a payee to a user's list of payees in an online bill payment system provided by a financial institution. The system comprises a website server which is in communication with the internet. The website servers may comprise one or more computers which are connected through one or more networks, such as the internet and/or a private network, to the user's computer. The computer(s) of the system are configured to enable a website accessible by users through the internet, and to access and/or store financial data of the user from various sources electronically accessible by the system through a communication network.

The website server is configured to perform the following steps: (i) accessing payee information by the bill payment system from one of a personal finance management software application, or a second financial institution different from the first financial institution; (ii) analyzing the payee information by a computer to identify a payee; (iii) determining if the automated bill payment system has payment information for the identified payee; and (iv) adding the identified payee, by the automated bill payment system, to the user's list of payees.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Figure 1:
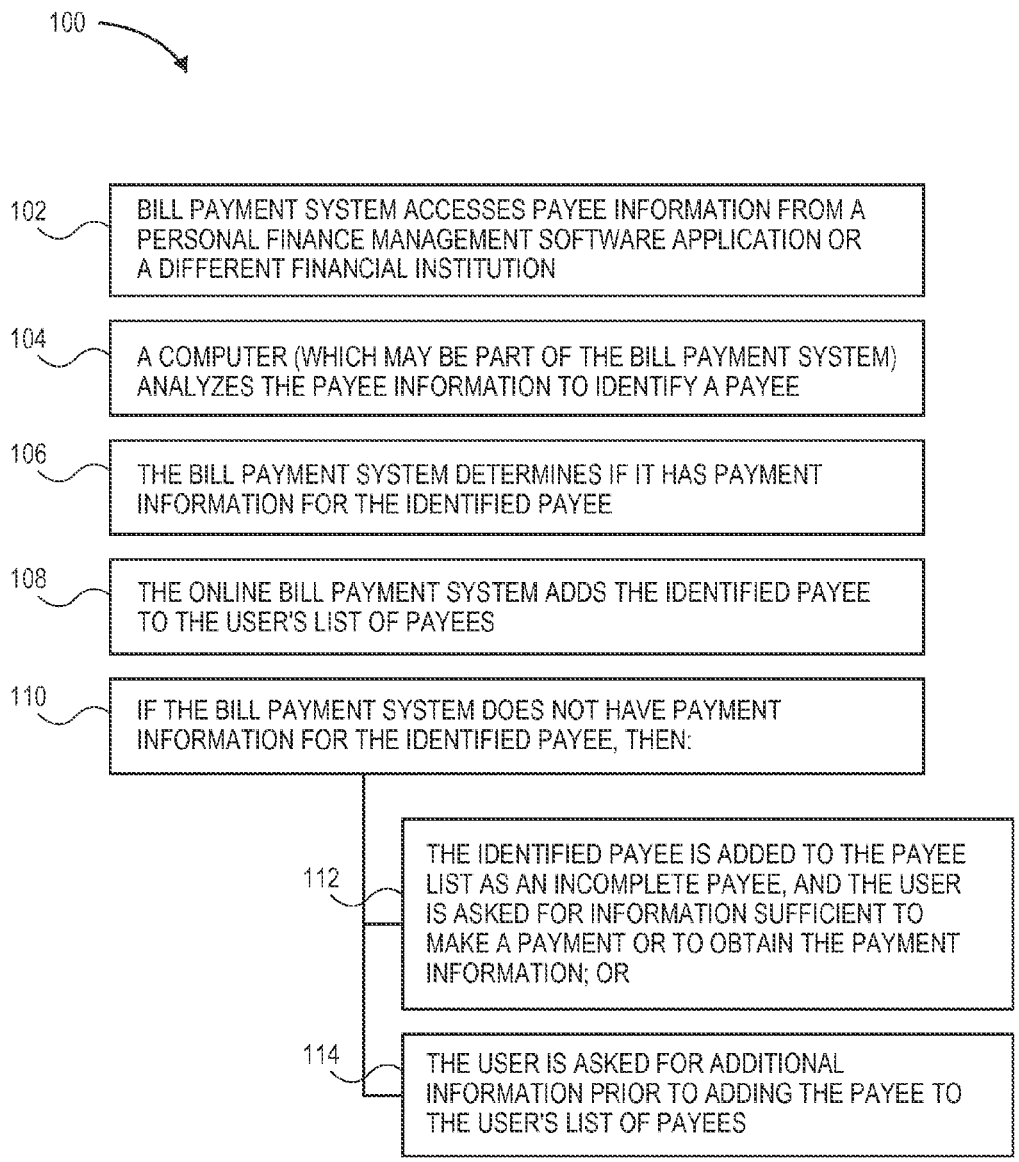
FIG. 1 is a flow chart of a method for adding a payee to a user's list of payees in an online bill payment system, according to one embodiment of the present invention.

Embodiments of the present invention are directed to computerized systems and methods for automated adding a payee to a user's list of payees in an online bill payment system. Referring to FIG. 1, in one embodiment, a computerized method 100 for adding a payee to a user's list of payees in an online bill payment system is shown. The online bill payment system is provided by a financial institution, such as a bank, stock broker or other financial services company, to its customers who are the users of the system. The online bill payment system may be operated directly by the financial institution, or by a website services provider contracted by the financial institution.

As described in more detail below, the method 100 will typically be implemented on a website server utilizing one or more software programs configured to carry out the steps of the method. The website server may include multiple computer servers. The online application is then accessible to a user via a computer connected to the internet. The user interface for the server based application can be an internet browser or specialized software residing on the local computer. Furthermore, the software program may be a stand-alone application, or it may be integrated into another software application. For instance, the software program may be integrated into a personal finance application such as FinanceWorks™ available from Intuit Financial Services, a unit of Intuit Inc., of Mountain View, Calif., Quicken® online, available from Intuit Inc., Mountain View, Calif., or Mint®, available at the website MINT.COM.

The method 100 comprises a step 102 in which the bill payment system accesses payee information from a source of financial data of the user, such as a personal finance management software application, or a financial institution. The financial data may include account information, financial transactions, and other financial information of the user. Payee information is data that is related to a payee of the user which can be used to identify the payment information for the payee, such as the identity of the payee, payee payment information, payee address, amount owed, payment due dates, and amounts due (such as minimum amount and total balance). The financial data includes payee information, and may also include other information that is not payee information, such as account balances for a savings account, and other data.

The financial data may be accessed by any one or more suitable methods. As an example, the financial data may be accessed by retrieving it from a personal finance management software application, or a data file created by such an application. For instance, the financial data may be accessed from a personal finance management application like Finance-Works™, Quicken® or Mint® (described above). If already used by the payer, applications such as these will typically already have stored numerous account and transaction data for the user. The user may grant access to the data stored in these applications to the online bill payment system 100 by any suitable method, such as providing the payer's credentials (e.g. usernames and passwords) to the online bill payment system and importing the data from a website or server, or uploading a data file to the online bill payment system.

The financial data may also be obtained by accessing financial data from the servers and/or storage devices of financial institutions through a network connection or by transferring storage media such as CDs, tape drives, hard disks, or the like. This financial data may even include bill payment data from a bill payment system of a different financial institution used by the user. The user may grant access to the user's financial data at other financial institutions, including a different online bill payment system of another financial institution, to the online bill payment system conducting the method 100. Access may be granted by obtaining the user's online banking credentials for the other financial institution, or otherwise obtaining authorization to access the data. The access may be through a website for the financial institution or a private network. The credentials typically include usernames and passwords. The bill payment system electronically accesses the financial data of the user from the financial institutions through a network that can access the online accounts. The bill payment system automatically enters the user's credentials and then obtains the financial data from the servers of the financial institutions. In these ways, step 102 may access the user's financial data largely automatically.

At step 104, a computer analyzes the financial data to identify a payee. An algorithm is used to analyze the financial data, including the financial data, to identify a payee. For instance, the algorithm may search for recurring transactions to a particular party, keywords likely to be related to payees of a user, and account numbers which can be matched to certain financial institutions (e.g. credit card numbers assigned to a particular credit card issuer). This computer analysis results in the identification of one or more identified payees. Step 104 may also analyze the financial data to determine recurring payment amounts, payment dates, or other payment details that can be used in setting up the payee in the online bill payment system.

The computer carrying out step 104 may be a part of the online bill payment system, or it may be separate computer. The separate computer may be in communication with the online bill payment system through a communication network. The identified payees are then electronically communicated to the online bill payment system.

At step 106, the online bill payment system determines if it has payment information for the identified payee(s). As an example, step 104 may result in a payee identified as AT&T Wireless, in Los Angeles, Calif. The online bill payment system searches its database of payees for which it has payment information and determines if it has payment information which matches the identified payee. The payment information includes at least sufficient information for the online bill payment system to make a payment to the payee. Thus, the payment information may include all or some of the following for the payee: name, address, phone number, and electronic funds transfer information.

At step 108, the online bill payment system adds the identified payee(s) to the user's list of payees. Thus, the identified payees are will show up in the user's list of payees the next time the user goes to the online bill payment system. Step 108 may also add other payment details for the payee into the bill payment system such as a recurring payment amount, payment date, or other payment details for setting up the payee in the online bill payment system.

In another optional aspect of the method 100, at step 110, if the online bill payment system does not have payment information for an identified payee, then it can take several other steps. For instance, the online bill payment system may need the user's account number or credentials in order for the bill payment system to make a payment to the payee on behalf of the user. As one possible action, at step 112, the online bill payment system can added the identified payee as an incomplete payee. For instance, the payee can be flagged or somehow marked as being incomplete in the user's list of payees, and the user is asked for more information about the payee so that the bill payment system has sufficient payment information to make a payment to the payee, or the bill payment system can go out and obtain the payment information. As one example, the user may provide a website for the payee, and the bill payment system can then access the payee's website and obtain the payment information. The user may even provide the user's username and password for the website of the payee, so that the bill payment system can obtain the payment information.

Alternatively, at step 114, the bill payment system may ask for additional information about the payee to obtain the payment information prior to adding the payee to the user's list of payees. The bill payment system may send an email to the user, or provide an alert to the user the next time the user logs in to the bill payment system.

Still, steps 112 and/or 114 would normally be a one-time operation for the user to set up the payee, and these steps require minimal user input. The method 100 will typically have done most of the work necessary to add a new payee to the user's list of payees on the online bill payment system.

Figure 2:
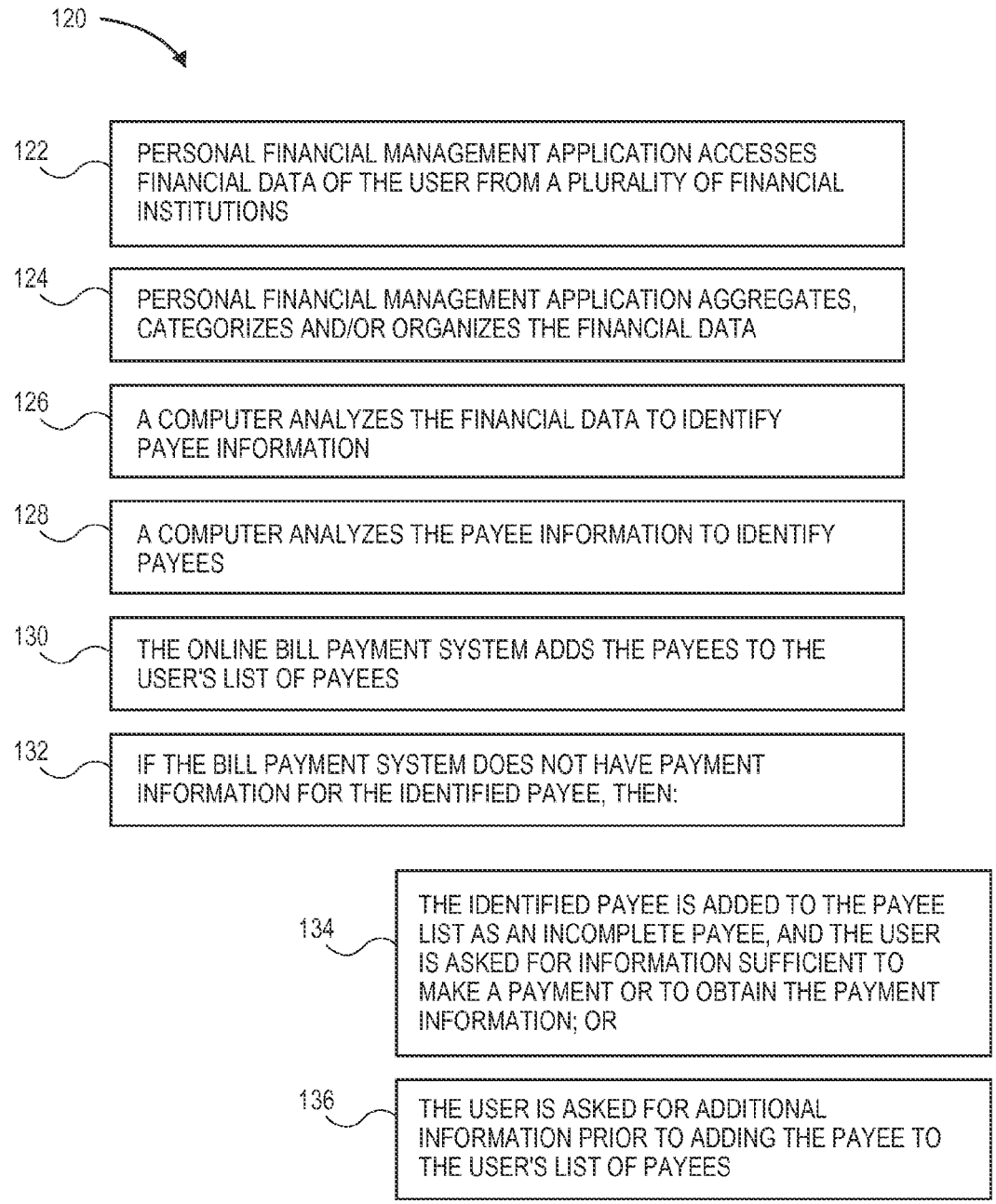
FIG. 2 is a flow chart of a method for adding a payee to a user's list of payees in an online bill payment system according to another embodiment of the present invention.

Turning now to FIG. 2, another embodiment of a computerized method 120 for adding a payee to a user's list of payees in an online bill payment system is shown. The method 120 comprises a step 122 in which a personal finance management application accesses financial data of the user from a plurality of financial institutions. The personal finance management application can access the financial data in any of the same ways that the online bill payment system accesses financial data at step 102 described above. The personal finance management application may be any of the applications described above, such as Quicken®, Mint®, Finance-Works®, or other application. The personal finance management application can be an online application accessible through the internet, or a stand-alone desktop application operated on a computer, such as a personal computer (PC). Furthermore, the personal finance management application can be a stand-alone application, or it can be integrated and/or in communication with the online bill payment system.

At step 124, the personal finance management application aggregates, categorizes and/or organizes the financial data accessed at step 122. At step 126, a computer analyzes the aggregated financial data in the personal finance management application to identify payee information. This computer can be the same computer on which resides the personal finance management application, or it can be a different computer. For example, the computer may be a part of the online bill payment system. In such an embodiment, the personal finance management application communicates the aggregated financial data to the online bill payment system, and a computer of the online bill payment system analyzes the aggregated financial data to identify payee information.

At step 128, a computer analyzes the payee information to identify payees. This step is basically the same as step 104 described above, and all of the description of step 104 applies equally to step 128. The computer performing step 128 may be the same computer that performs step 126, or it can be a different computer. Thus, the computer performing step 128 can be the computer on which resides the personal finance management application. If the aggregated financial data is communicated to the online bill payment system such that the online bill payment system performs step 126, then it would be preferable that the computer performing step 128 would also be a computer of the online bill payment system.

Alternatively, a different computer not a part of the online bill payment system, or the computer having the personal finance management may be utilized to perform steps 126 and 128. In this case, the computer may be a dedicated payee analysis computer, and the personal finance management application would first communicate the aggregated financial data to this computer, and then the computer would perform steps 126 and 128.

Moreover, steps 126 and 128 may be performed simultaneously, in which case the computer would analyze the aggregated financial data which includes payee information to identify one or more payees.

At step 130, the online bill payment system adds the payees to the user's list of payees. If step 128 is performed by a computer that is not a part of the online bill payment system, then this computer may be in communication with the online bill payment system through a communication network. The identified payees would then be electronically communicated to the online bill payment system. Step 130 is the same as, or substantially similar to, step 108, and all of the description of step 108 applies equally to step 130.

Steps 132, 134 and 136 are the same as steps 110, 112 and 114, respectively, and therefore, the description of steps 110, 112 and 114 above applies equally to steps 132, 134 and 136.

Figure 3:
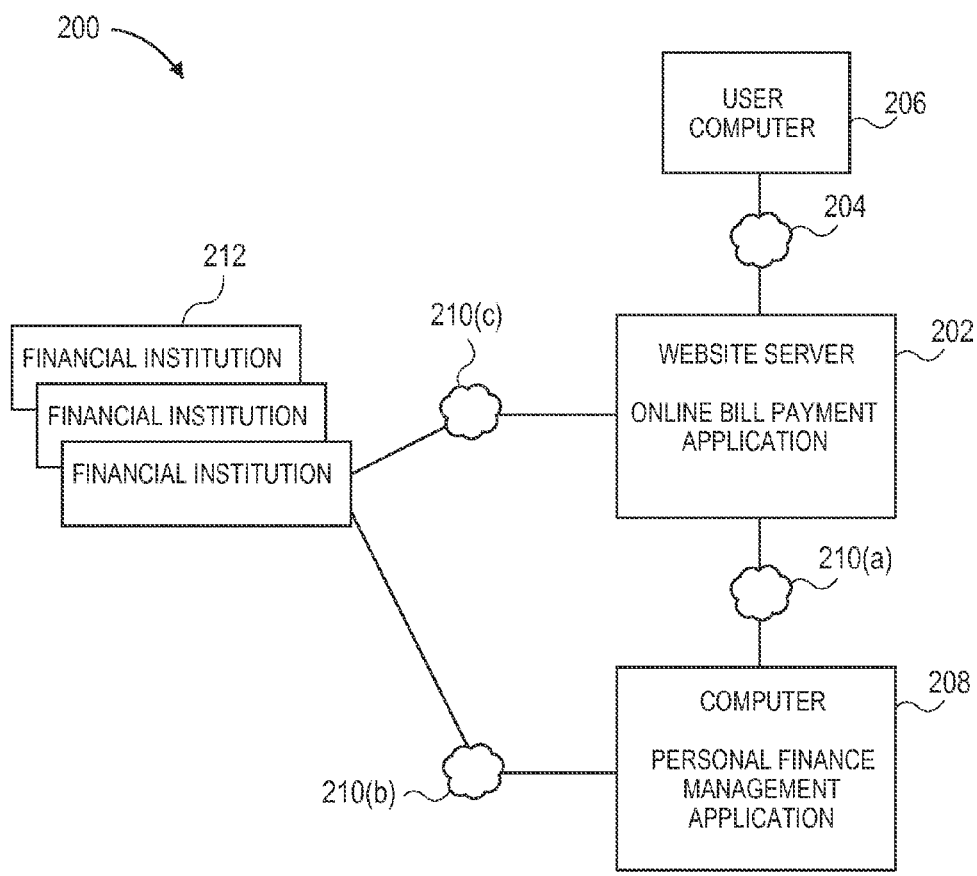
FIG. 3 illustrates a system for adding a payee to a user's list of payees in an online bill payment system, according to the methods of the present invention, according to another embodiment of the present invention.

Referring now to FIG. 3, a non-limiting example of a system 200 for implementing any of the methods 100 and 120, as shown in FIGS. 1 and 2, as well as other method embodiments that may be described herein, is depicted. It should be understood that not all of the components of the system 200 may be needed to implement each of the methods of the present invention, and therefore, the system may include only those components necessary to perform the method embodiments as described herein.

The system 200 comprises a website server 202 which is in communication with the internet 204. The website server 202 has an online bill payment application configured to provide online bill payment functionality for a user. The website server is further programmed to perform the steps of any of the methods 100 and 120, as well as any other method embodiments described herein. Accordingly, the website server 202 includes pages, files and programming to interact with a user computer 206 to accomplish the online bill payment functions as well as the methods of the present invention. The user accesses and utilizes the online bill payment application on the website server through a computer 206 connected to the internet 204 using a web browser.

The website server 202 may be a collection of servers in operable communication with each other in which at least one of the servers is connected to the internet 204. The website server 202 is also in communication with a computer 208 having a personal finance management application through a network 210(a). This allows the website server to access financial data from the personal finance management application.

The website server 202 is also in communication with a plurality of financial institutions 212 through a network 210 (c) for accessing financial data from the financial institutions 212. The computer 208 may also be in communication with a plurality of financial institutions 212 through a network 210 (b), also for accessing financial data from financial institutions 212.

Each of the networks 210(a)-(c) may include a proprietary network, LAN, WAN, cellular network, wireless network, the internet and/or other suitable network. The financial institution server 212 may also comprise one or multiple servers. As described above, the website server 202 and online bill payment application may be operated by the financial institution or a third party host. One example of a third party host that provides website servers for providing online banking services for financial institutions and their customers is Intuit Financial Services.

Accordingly, a system 200 is provided which can be used to add a payee to a user's list of payees in an online bill payment system of a financial institution.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in FIGS. 1 and 2 are not intended to be limited to a particular sequential order, unless otherwise stated or required.

Accordingly, embodiments are intended to exemplify alternatives, modifications, and equivalents that may fall within the scope of the claims.

What is claimed is:

1. A method for adding a payee to a user's list of payees in an online bill payment system provided by a first financial institution, comprising the following steps:
   accessing financial data by the online bill payment system from one of a personal finance management software application, or a second financial institution different from the first financial institution;
   analyzing the financial data by a computer to identify a payee;

determining that the online bill payment system does not have sufficient payment information for the identified payee to make a payment to the payee;

adding the identified payee, by the online bill payment system, as an incomplete payee in the user's list of payees;

requesting the user to provide additional information for making a payment to the identified payee;

receiving additional information sufficient to make a payment to the identified payee;

adding the identified payee, by the online bill payment system, to the user's list of payees to whom payments may be made using the online bill payment system.

2. The method of claim 1, wherein the financial data includes payee account information for the user, financial transaction data of the user, and bill payment information of the user.

3. The method of claim 1, wherein the computer is a part of the online bill payment system.

4. The method of claim 1, wherein the computer is not a part of the online bill payment system, and further comprising the step of: communicating the identified payee from the computer to the online bill payment system.

5. A method for adding a payee to a user's list of payees in an online bill payment system provided by a financial institution, comprising the following steps:

aggregating financial data from a plurality of different financial institutions into a personal finance management application;

analyzing the financial data by a first computer to identify payee information;

analyzing the payee information by a computer selected from the group consisting of said first computer or a second computer, to identify one or more payees;

determining that the online bill payment system does not have sufficient payment information for the one or more payees to make a payment to the one or more payees;

adding the one or more identified payees, by the online bill payment system, as an incomplete payees in the user's list of payees;

requesting the user to provide additional information for making a payment to the one or more identified payees;

receiving additional information sufficient to make a payment to the one or more identified payees;

adding the one or more identified payees, by the online bill payment system, to the user's list of payees to whom payments may be made using the online bill payment system.

6. The method of claim 5, wherein the financial data includes payee account information for the user, financial transaction data of the user, and bill payment information of the user.

7. The method of claim 5, wherein the first computer is a part of the online bill payment system.

8. The method of claim 5, wherein the personal finance management application resides on said first computer, and further comprising the step of: communicating the identified payee from the first computer to the online bill payment system.

9. The method of claim 5, wherein the personal finance management application resides on said first computer.

10. The method of claim 5, wherein said personal finance management application is an internet based online application, said step of analyzing the payee information by a computer to identify one or more payees is performed on said first computer, and further comprising the step of: communicating the identified payee from the first computer to the online bill payment system.

11. The method of claim 5, wherein said second computer is a part of the online bill payment system.

12. The method of claim 1, wherein requesting the user to provide additional information for making a payment to the identified payee is in response to the user attempting to make a payment to the identified payee.

13. The method of claim 5, wherein requesting the user to provide additional information for making a payment to the one or more identified payees is in response to the user attempting to make a payment to one of the one or more identified payees.

* * * * *